United States Patent
Choi et al.

(10) Patent No.: US 10,560,813 B2
(45) Date of Patent: Feb. 11, 2020

(54) METHOD AND APPARATUS FOR INDEX-CODED MULTICAST TRANSMISSION IN A WIRELESS COMMUNICATION SYSTEM

(71) Applicant: LG ELECTRONICS INC., Seoul (KR)

(72) Inventors: Wan Choi, Seoul (KR); Bi Hong, Seoul (KR); Kyungrak Son, Seoul (KR); Dongin Kim, Seoul (KR); Hanbyul Seo, Seoul (KR)

(73) Assignees: LG Electronics Inc., Seoul (KR); Research & Business Foundation Sungkyunkwan University, Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/678,897

(22) Filed: Aug. 16, 2017

(65) Prior Publication Data

US 2018/0054716 A1  Feb. 22, 2018

Related U.S. Application Data

(60) Provisional application No. 62/375,458, filed on Aug. 16, 2016.

(51) Int. Cl.
| | |
|---|---|
| *H04H 20/71* | (2008.01) |
| *H04W 4/06* | (2009.01) |
| *H04L 29/08* | (2006.01) |
| *H04L 12/18* | (2006.01) |
| *H04L 29/14* | (2006.01) |

(52) U.S. Cl.
CPC .............. *H04W 4/06* (2013.01); *H04L 12/189* (2013.01); *H04L 67/2842* (2013.01); *H04L 69/40* (2013.01)

(58) Field of Classification Search
CPC ........ H04W 4/06; H04L 69/40; H04L 12/189; H04L 67/2842
See application file for complete search history.

(56) References Cited

U.S. PATENT DOCUMENTS

| | | | | |
|---|---|---|---|---|
| 2008/0267106 A1* | 10/2008 | Buddhikot | .............. | H04L 45/16 370/312 |
| 2009/0217118 A1* | 8/2009 | Miki | .................... | H04L 1/1887 714/748 |
| 2010/0061287 A1* | 3/2010 | Josiam | .............. | H03M 13/6306 370/312 |
| 2010/0128650 A1* | 5/2010 | Morimoto | ............. | H04L 1/0015 370/312 |
| 2010/0214971 A1* | 8/2010 | Wei | ........................ | H04H 60/11 370/312 |
| 2010/0290383 A1* | 11/2010 | Wu | ....................... | H04L 1/1607 370/312 |

* cited by examiner

*Primary Examiner* — Clemence S Han
(74) *Attorney, Agent, or Firm* — Dentons US LLP

(57) ABSTRACT

A method for transmitting downlink data in a multicast scheme by a base station in a wireless communication system is disclosed. The method includes receiving a first request signal requesting first data from a first user equipment (UE), receiving a second request signal requesting second data from a second UE, generating a transmission message by applying an exclusive OR (XOR) operation to the first data and the second data, and transmitting the transmission message to the first UE and the second UE in the multicast scheme.

8 Claims, 4 Drawing Sheets

METHOD AND APPARATUS FOR INDEX-CODED MULTICAST TRANSMISSION IN A WIRELESS COMMUNICATION SYSTEM

This application claims the benefit of US Provisional Application No. 62/375,458, filed on Aug. 16, 2016, which is hereby incorporated by reference as if fully set forth herein.

BACKGROUND OF THE INVENTION

Field of the Invention

The present disclosure relates to a wireless communication system, and more particularly, to a method and apparatus for index-coded multicast transmission in a wireless communication system.

Discussion of the Related Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an evolved universal mobile telecommunications system (E-UMTS) as an exemplary radio communication system. E-UMTS is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Accordingly, the present disclosure is directed to a method and apparatus for index-coded multicast transmission in a wireless communication system that substantially obviate one or more problems due to limitations and disadvantages of the related art.

An aspect of the present disclosure is to provide a method and apparatus for index-coded multicast transmission in a wireless communication system.

Additional advantages, objects, and features of the invention will be set forth in part in the description which follows and in part will become apparent to those having ordinary skill in the art upon examination of the following or may be learned from practice of the present disclosure.

The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a method for transmitting downlink data in a multicast scheme by a base station in a wireless communication system includes receiving a first request signal requesting first data from a first user equipment (UE), receiving a second request signal requesting second data from a second UE, generating a transmission message by applying an exclusive OR (XOR) operation to the first data and the second data, and transmitting the transmission message to the first UE and the second UE in the multicast scheme.

In another aspect of the present disclosure, a base station in a wireless communication system includes a radio frequency (RF) module, and a processor connected to the RF module. The processor is configured to receive a first request signal requesting first data from a first UE, receive a second request signal requesting second data from a second UE, and transmit a transmission message in a multicast scheme, the transmission message being generated by applying an exclusive OR (XOR) operation to the first data and the second data.

The first request signal may include information indicating that the second data exists in a cache of the first UE, and the second request signal may include information indicating that the first data exists in a cache of the second UE.

The transmission message may include information indicating that the XOR operation is applied to the first data and the second data. Or the BS may transmit scheduling information required to receive the transmission message to the first UE and the second UE, and the scheduling information may include information indicating that the XOR operation is applied to the first data and the second data.

Additionally, the BS may group the first UE and the second UE into a multicast group, and determine a size of the transmission message based on information stored in a cache of the first UE and information stored in a cache of the second UE.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE INVENTION

Figure 1:
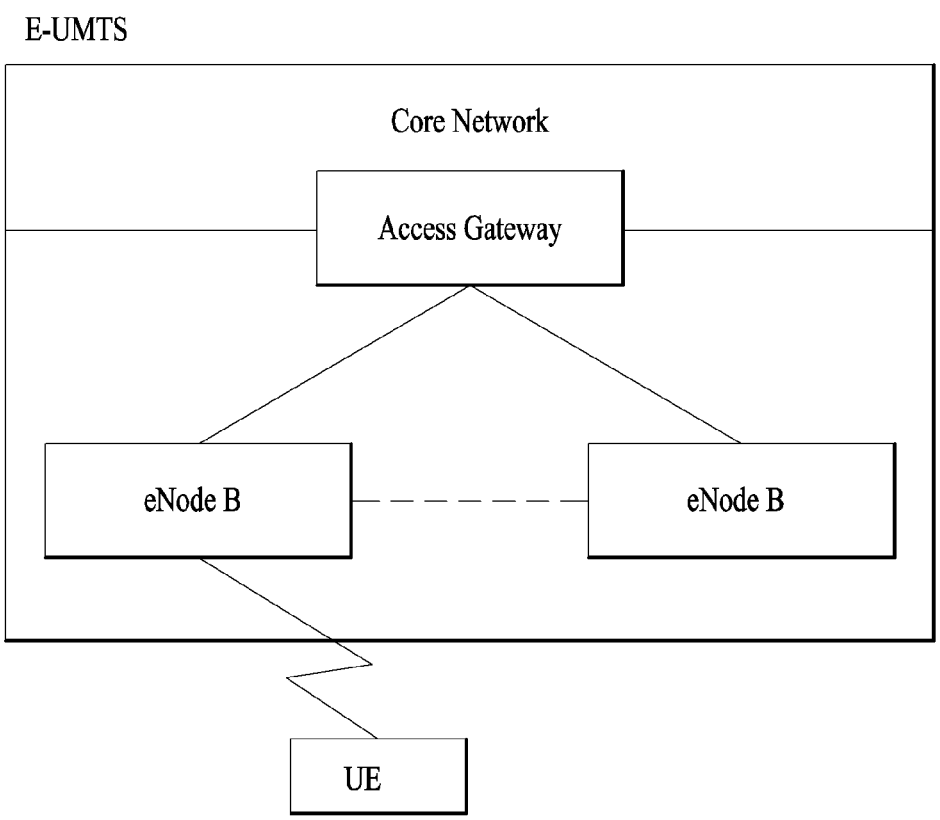
FIG. 1 is a view schematically illustrating a network structure of an evolved universal mobile telecommunications system (E-UMTS) as an exemplary radio communication system.

The configuration, operation, and other features of the present disclosure will be readily understood by embodiments of the present disclosure described below with reference to the attached drawings. The embodiments of the present disclosure described below are examples in which the technical features of the present disclosure are applied to a $3^{rd}$ generation partnership project (3GPP) system.

In the present disclosure, the term 'base station (BS)' may cover remote radio head (RRH), evolved node B (eNB), transmission point (TP), reception point (RP), relay, and so on.

The present disclosure provides a method for, when a plurality of user equipments (UEs) request different information to a BS, transmitting the different transmission simultaneously based on the idea that each of the UEs pre-stores information of other UEs, and a method for determining a transmission time adaptively according to the channel environment of each multicast group, when a total transmission time is constant in this case.

For transmission in a manner that satisfies requests of a plurality of users at the same time, a UE needs to check its pre-stored information, that is, cached information and index-encode the cached information. Although the index-coded multicast transmission method of the present disclosure seems to be similar to a legacy multicast method in that requests of a plurality of UEs are satisfied at the same time, the index-coded multicast transmission method of the present disclosure is different from the legacy multicast method in that multicast is possible only in an environment in which UEs request the same information in the latter, whereas even when UEs request different information, the information may be multicast using cached information in the former.

Further, compared to a legacy unicast method in which different pieces of information are transmitted separately, the index-coded multicast transmission method of the present disclosure may advantageously complete transmissions by a smaller number of transmissions through an index coding scheme that simultaneously satisfies requests of UEs for different information. Compared to the legacy multicast method, the index-coded multicast transmission method of the present disclosure determines transmission times rates adaptively according to the channel environments of UEs, thereby shortening a service outage probability.

Conventionally, a BS configures messages irrespective of the presence or absence of caches, and thus transmits packets including different information one by one. Moreover, a packet is repeatedly transmitted until a UE requesting the packet successfully receives the packet. Herein, to minimize the service outage probability, a transmission time for the packet is determined adaptively. However, since the transmitted information is valid only to the UE requesting the information, the transmission time is determined only in consideration of the channel environment of the UE. In addition, a legacy index coding technique does not reflect basic characteristics of wireless communication, such as errors caused by noise or a channel. Accordingly, there is a need for designing an index coding technique in a complex manner. Further, since a transmission time is not changed adaptively according to a multicast packet, system efficiency is decreased.

To solve the problem, the present disclosure proposes simultaneous transmission of different pieces of information through an exclusive OR (XOR) operation, compared to the conventional technology of individually transmitting different pieces of information. Therefore, a service probability satisfying requests of all UEs may be decreased, relative to the conventional technology. While packets are transmitted one by one due to non-use of cached information and thus as many packets as the number of files are needed in the conventional technology, the number of packets may be reduced effectively by use of cached information. Optimization may also be reflected by changing an optimal transmission time desired by each UE according to the channel environments of UEs to which a multicast packet is to be transmitted.

Figure 2:
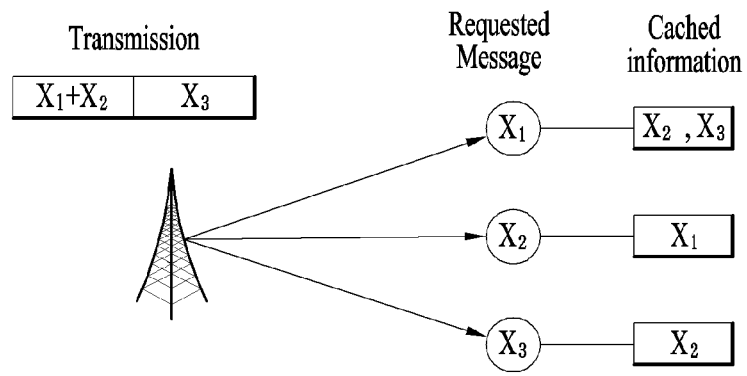
FIG. 2 is an exemplary view illustrating an environment in which there are a base station (BS) and a plurality of user equipments (UEs), to which the present disclosure is applied.

FIG. 2 is an exemplary view illustrating an environment in which there are a BS and a plurality of UEs, to which the present disclosure is applied. Particularly, it is assumed that each of N UEs requests a different one of N files, $M_G = \{x_1, x_2, \ldots, x_N\}$.

Referring to FIG. 2, it is assumed that each UE already has a file except for its requested file among three files, as side information, and the BS has prior knowledge of cached information of each UE. If N is 2, a second UE (UE2) has a first file (file 1), a first UE (UE1) has a second file (file 2), and the BS multicasts file 1 and file 2 by XOR. Therefore, a request of UE1 for file 1 and a request of UE2 for file 2 may be satisfied by one multicast transmission. Additionally, when each UE transmits a request message, the UE may also transmit information about its cached data.

Eventually, the core of the present disclosure lies in a BS's knowledge of cached information of UEs, that is, synchronization of cached data between the UEs and the BS. Therefore, there is a need for providing a UE with information indicating which data among the cached data of the UEs is XOR-operated with current multicast data. For example, the information may be included in the multicast data itself or individually provided scheduling information.

In a situation where an error occurs due to a channel and noise between the BS and each UE, it is assumed that the channel changes every coherence time (slow fading) and one packet is shorter than the coherence time. In this case, if the BS knows a channel state, the BS may transmit information at a transmission rate adaptive to the channel. On the other hand, if the BS knows only a distribution without knowledge of the channel state, the BS should multicast information at a fixed transmission rate R. Further, total messages are divided into multicast groups through index coding, and a transmission time is determined for each multicast group. Now, a description will be given of a criterion based on which, when a total transmission time is constant, an optimal transmission time for each multicast group is determined, and a transmission time for each index-coded code is determined in a manner that minimizes an overall service outage probability.

The present disclosure operates as follows.

1) The BS has prior knowledge of cached information that UEs have. Only one index-coded packet is transmitted in each time/frequency (unit resource) A combination of UEs to which information is to be multicast, and the transmission size of a packet are determined by parameters such as a channel distribution between the BS and each UE and side information of each UE.

If the BS has knowledge of channels, the BS may transmit information at variable rates adapted to the channels. On the other hand, if the BS knows only a distribution without knowledge of the channels, the BS should transmit information at a fixed transmission rate R without changing the transmission rate adaptively to the channels, and thus an occurrence of a service outage probability is inevitable. Therefore, in the case where the BS knows only a distribution without knowledge of the channels, if the size of a file requested by a user is BC and a transmission time for each link is $T_i$, an error occurs to the link with an average probability of $p_i$. Herein, $p_i$ is determined by the following [Equation 1].

$$p_i = P\left[\log(1 + |h_i|^2 SNR) < \frac{B}{T_i}\right] \quad \text{[Equation 1]}$$

$$\begin{pmatrix} \text{in the case of } h_i \sim CN(0, \sigma_i^2), \\ p_i = 1 - \exp\left(-\frac{2^{B/T_i}-1}{\sigma_i^2 SNR}\right) \end{pmatrix}$$

2) A packet to be multicast is determined based on the form of cached information (i.e., side information) that each UE has, in the following index coding scheme.

In the case of the cached information illustrated in FIG. 2, the relationship between information of each UE and information of other UEs may be expressed as a matrix such as $$\begin{bmatrix} ? & 1 & 1 \\ 1 & ? & 0 \\ 0 & 1 & ? \end{bmatrix}$$

The matrix has 0s or 1s as its elements. An $I^{th}$ column represents a request message of an $I^{th}$ UE and an $I^{th}$ row represents a message that each UE has.

Particularly, if the $I^{th}$ row and a $J^{th}$ column are 1s in the matrix, this implies that the $I^{th}$ UE has a $J^{th}$ message. In addition, if I=J, both 0 and 1 are available as the value.

Among matrices satisfying this condition, the bases of a matrix having a smallest rank may be regarded as a combination of messages to be transmitted simultaneously by XOR. In the case illustrated in FIG. 2, the message combination may be determined to be $x_1 \oplus x_2$, $x_3$.

3) Subsequently, a combination of messages to be transmitted simultaneously by index coding descried in 2) is determined.

To determine a service outage probability for each multicast packet, it is assumed that two messages are multicast (i.e., $x_1$ and $x_2$ are transmitted simultaneously by XOR). A service outage probability for two UEs is determined by the following [Equation 2].

$$P_e = 1 - (1 - p_1)(1 - p_2) \quad \text{[Equation 2]}$$

$$= 1 - \exp\left[-\left(\frac{1}{\sigma_1^2} + \frac{1}{\sigma_2^2}\right)\frac{2^{B/T_i}-1}{SNR}\right]$$

Figure 3:
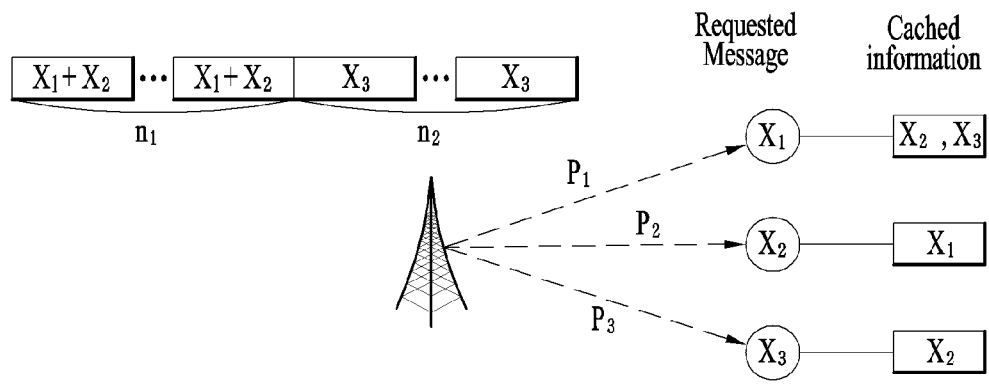
FIG. 3 is an exemplary view illustrating a mobile communication system in which there are a plurality of UEs having fixed cached information according to an embodiment of the present disclosure.

FIG. 3 is an exemplary view illustrating a mobile communication system in which there are a plurality of UEs having fixed cached information according to an embodiment of the present disclosure.

Referring to FIG. 3, with [Equation 2] generalized, the number of transmissions for any number of UEs, that is, n1+n2 of FIG. 3 may be calculated by the following [Equation 3].

$$1 - \exp\left[\left(\sum_i \frac{1}{\sigma_i^2}\right)\frac{2^{B/T_i}-1}{SNR}\right] \quad \text{[Equation 3]}$$

Figure 4:
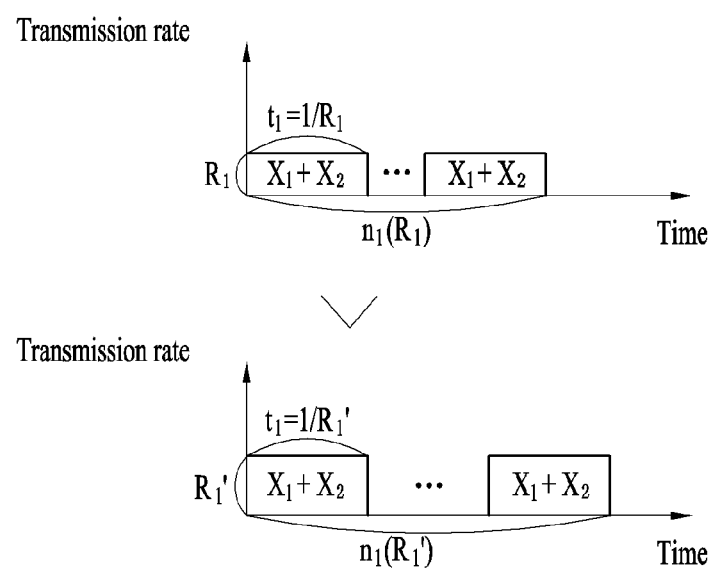
FIG. 4 is an exemplary view illustrating changes in a service outage probability according to changes in the transmission time of a multicast packet according to an embodiment of the present disclosure.

FIG. 4 is an exemplary view illustrating changes in a service outage probability according to changes in the transmission time of a multicast packet according to an embodiment of the present disclosure.

Referring to FIG. 4, it may be noted that an error rate of a UE is determined according to a fixed transmission rate R, and a total number of transmissions required for successful reception of one packet is changed according to the error rate. Specifically, if the size of a file requested by the UE is 1, an actual number of transmissions is 1/R and a total transmission time is (1/R*number of transmissions of packet).

In the absence of cached information, all messages may be transmitted for equal transmission times without determining transmission rates adaptively. However, in this case, it is best to transmit the messages for transmission times $T_1, \ldots, T_N$ that minimize a convex function on $\{T_1, \ldots, T_N\} \in (0, +\infty)$ described in the following [Equation 4].

$$1 - \exp\left[\sum_i \frac{2^{B/T_i}-1}{\sigma_i^2 SNR}\right] \quad \text{[Equation 4]}$$

If a transmission time is determined adaptively according to each packet, a higher performance is achieved than in the case of transmissions of packets for equal transmission times. Similarly, in the presence of side information, a message combination $\{G_1, \ldots, G_N\}$ may be determined for each multicast group as described in 2), and optimal transmission times for the message combination may be determined by the optimization problem of the following [Equation 5].

$$\max_{\substack{\{G_1,\ldots,G_N\}\in\mathcal{P} \\ \{T_1,\ldots,T_N\}}} P_e(G_1, \ldots, G_N, T_1, \ldots, T_N) =$$ [Equation 5]

$$\max_{\substack{\{G_1,\ldots,G_N\}\in\mathcal{P} \\ \{T_1,\ldots,T_N\}}} 1 - \exp\left[\sum_{i=1}^{K}\left(\sum_{j\in G_i}\frac{1}{\sigma_j^2}\right)\frac{2^{B/T_i}-1}{SNR}\right]$$

In the optimization problem of [Equation 5], P is a partition of $M_G$, representing a multicast group distinguishing scheme ($\cup_{A\in P} A = M_G$). In addition, $\{T_i\}$ represents an optimal transmission time for each multicast group, and $\{\sigma_i\}$ represents a channel variance between each UE and the BS.

An optimal index code and an optimal time for each multicast group, which are achieved by the optimization problem, may be acquired by the algorithm of [Table 1] below.

TABLE 1

Algorithm 1 Majorization based index coding searching algorithm

1:  Initialization: Randomly choose the index code $\mathcal{G}_1^*, \ldots, \mathcal{G}_N^*$ and calculate effective pathloss $\Gamma_{\mathcal{G}_1^*}, \ldots, \Gamma_{\mathcal{G}_N^*}$ and optimal time allocation $T_1^*, \ldots, T_N^*$.
2:  for all $\mathcal{G}_1^*, \ldots, \mathcal{G}_N^* \in \mathcal{P}_d$ do
3:      calculate $\Gamma_{\mathcal{G}_1}, \ldots, \Gamma_{\mathcal{G}_N}$
4:      if $(\Gamma_{\mathcal{G}_1}, \ldots, \Gamma_{\mathcal{G}_N}) \succ (\Gamma_{\mathcal{G}_1^*}, \ldots, \Gamma_{\mathcal{G}_N^*})$ then
5:          $(\mathcal{G}_1^*, \ldots, \mathcal{G}_N^*) = (\mathcal{G}_1, \ldots, \mathcal{G}_N)$;
6:      else
7:          calculate $T_1, \ldots, T_N$;
8:          if $P_e(\mathcal{G}_1, \ldots, \mathcal{G}_N, T_1, \ldots, T_N) \leq P_e(\mathcal{G}_1^*, \ldots, \mathcal{G}_N^*, T_1^*, \ldots, T_N^*)$ then
9:              $(\mathcal{G}_1^*, \ldots, \mathcal{G}_N^*) = (\mathcal{G}_1, \ldots, \mathcal{G}_N)$
10:             $(T_1^*, \ldots, T_N^*) = (T_1, \ldots, T_N)$
11:         end if
12:     end if
13: end if
14: Output: the optimal index coding sequence $\mathcal{G}_1^*, \ldots, \mathcal{G}_N^*$ And time allocation $T_1^*, \ldots, T_N^*$ In the above algorithm, $\succ$ represents majorization ordering which is partial orderings, $T_i$ represents an optimal transmission time allocated to an $i^{th}$ multicast group, and $\Gamma_{G_i}$ represents the inverse of an actual channel variance for a multicast group $G_i$, as expressed as [Equation 7].

$$T_i = \frac{B \cdot \ln 2/2}{w\left(\sqrt{(\lambda \cdot B \cdot SNR \cdot \ln 2)/4\Gamma_{G_i}}\right)}$$ [Equation 6]

$$\Gamma_{G_i} = \sum_{k\in G_i}\sigma_k^{-2}$$ [Equation 7]

Figure 5:
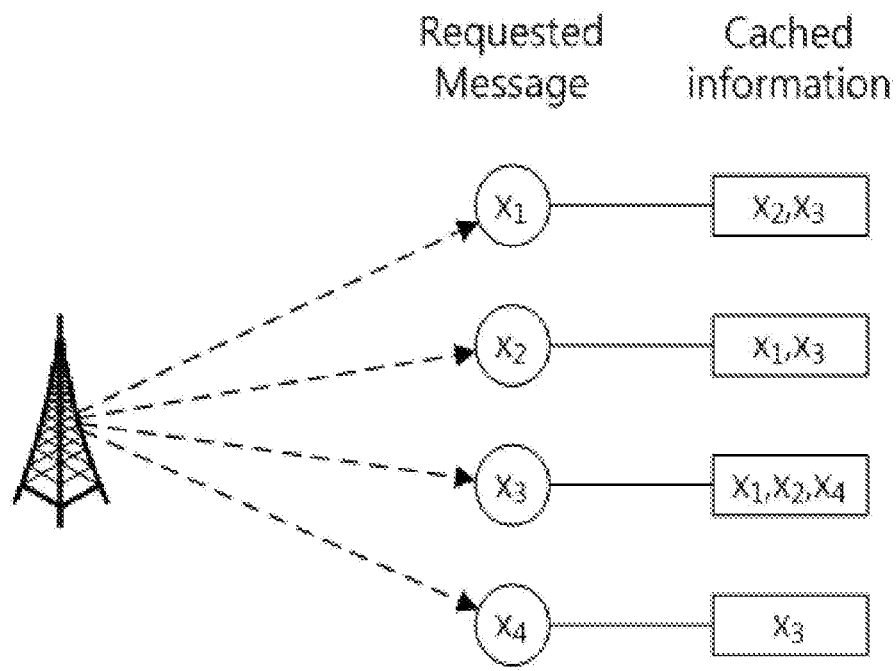
FIG. 5 is a view illustrating an example of changing an optimal index code according to a channel according to an embodiment of the present disclosure.

Compared to the conventional technology in which an index code that simply leads to a minimum length is an optimal index code, it may be noted from the example of FIG. 5 that an optimal index code changes according to a channel.

FIG. 5 is a view illustrating an example of changing an optimal index code according to a channel according to an embodiment of the present disclosure.

In FIG. 5 illustrating a case in which cached information is fixed, a conventional index coded-related study regards both multicast groups $(G_1, G_2, G_3, G_4)=(\{1,2,3\}, \{4\}, \phi, \phi)$ and $(G_1, G_2, G_3, G_4)=(\{1,2\}, \{3,4\}, \phi, \phi)$ as optimal index codes because they achieve a minimum length of 2.

However, because a channel environment is considered in the present disclosure, performance varies. Specifically, if the channel environment is given as $(\sigma_1^2, \sigma_2^2, \sigma_3^2, \sigma_4^2)=(10,5,1,0.5)$, $(G_1, G_2, G_3, G_4)=(\{1,2,3\}, \{4\}, \phi, \phi)$ is an optimal code index. If the channel environment is given as $(\sigma_1^2, \sigma_2^2, \sigma_3^2, \sigma_4^2)=(2,1,1,5)$, $(G_1, G_2, G_3, G_4)=(\{1,2\}, \{3,4\}, \phi, \phi)$ is an optimal code index.

According to the present disclosure, the efficiency of a mobile communication system may be increased by relieving the burden of a BS that services UEs through the utilization of caches and changes of a transmission time. Each user may decode without interference, using cached information of the user. Each UE may decode data without interference, using its cached information, and the BS may reduce unnecessary traffic by simultaneously supporting UEs requesting different information. Further, as a transmission time is dynamically determined according to the channel environment of a UE, the efficiency of transmission based on cached information may further be increased.

Figure 6:
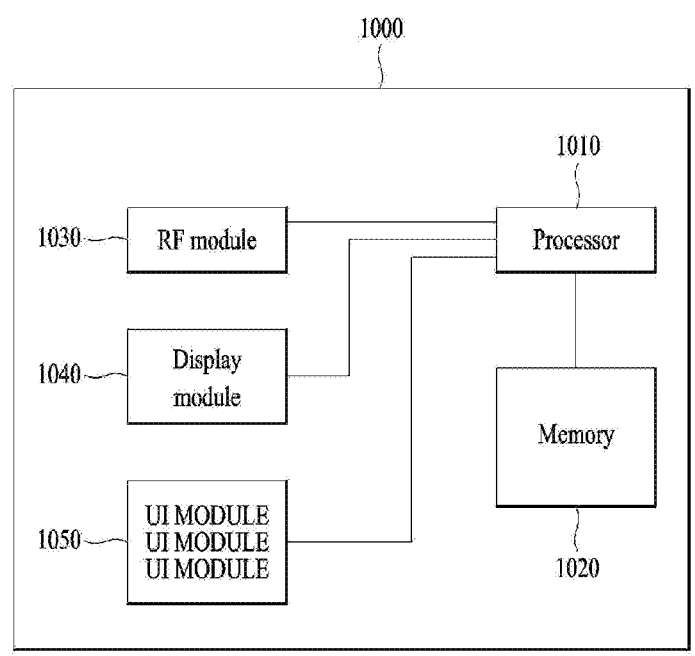
FIG. 6 is a block diagram of a communication apparatus according to an embodiment of the present disclosure.

FIG. 6 is a block diagram of a communication apparatus according to an embodiment of the present disclosure.

Referring to FIG. 6, a communication device 1000 includes a processor 1010, a memory 1020, an RF module 1030, a display module 1040, and a user interface module 1050.

The communication device 1000 is illustrated for convenience of description and some modules may not be omitted. The communication device 1000 may further include necessary modules. In addition, some modules of the communication device 1000 may be subdivided. The processor 1010 is configured to perform operations according to the embodiment of the present invention that is exemplified with reference to the diagrams. In detail, a detailed operation of the processor 1010 would be understood with reference to FIGS. 1 to 5.

The memory 1020 is connected to the processor 1010 and stores an operating system, an application, a program code, data, etc. The RF module 1030 is connected to the processor 1010 and converts a baseband signal into a radio signal or converts a radio signal into a baseband signal. To this end, the RF module 1030 performs analog conversion, amplification, filtering, and frequency up-conversion, or inverse procedures thereof. The display module 1040 is connected to the processor 1010 and displays various pieces of information. The display module 1040 may use, but is not limited to, well-known elements such as a liquid crystal display (LCD), a light emitting diode (LED), and an organic light emitting diode (OLED). The user interface module 1050 may be connected to the processor 1010 and may include a combination of well-known user interfaces such as keypads, touchscreens, etc.

As is apparent from the foregoing description of the present disclosure, the efficiency of a mobile communication system may be increased by relieving the burden of a BS that services UEs through the utilization of caches and changes of a transmission time. Each user may decode without interference, using cached information of the user. Each UE may decode data without interference, using its cached information, and the BS may reduce unnecessary traffic by simultaneously supporting UEs requesting different information. Further, as a transmission time is dynamically determined according to the channel environment of a UE, the efficiency of transmission based on cached information may further be increased.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure may be achieved by various means, for example, hardware, firmware, software, or a combination thereof. In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for transmitting downlink data by a base station (BS) in a wireless communication system, the method comprising:
    receiving, from a first user equipment (UE), a first request signal for first data;
    receiving, from a second UE, a second request signal for second data;
    grouping the first and the second UEs into a multicast group, and
    transmitting, to the first and the second UEs, downlink data based on reception of cashed information for the multicast group,
    wherein one transmission packet generated based on an exclusive OR (XOR) operation for the first and the second data, is transmitted to the first and the second UEs based on a first transmission time, when the cashed information is received,
    wherein the first and the second data are transmitted respectively to the first and the second UEs based on a same second transmission time, when the cashed information is not received, and
    wherein the first transmission time is a transmission time obtained for the one transmission packet, based on consideration of all channel environments between UEs in the multicast group and the BS.

2. The method according to claim 1, wherein the first request signal includes information on whether the second data exists in a cache of the first UE, and the second request signal includes information on whether the first data exists in a cache of the second UE.

3. The method according to claim 1, wherein the one transmission packet includes information on whether the XOR operation is used for the first and the second data.

4. The method according to claim 1, further comprising:
    transmitting scheduling information required for the first and the second UEs to receive the one transmission packet,
    wherein the scheduling information includes information on whether the XOR operation is used for the first and the second data.

5. A base station (BS) in a wireless communication system, the BS comprising:
    a receiver and transmitter; and
    at least one processor operatively coupled to the receiver and transmitter,
    wherein the at least one processor is configured to:
    control the receiver to receive, from a first user equipment (UE), a first request signal for first data,
    control the receiver to receive, from a second UE, a second request signal for second data,
    group the first and the second UEs into a multicast group, and
    control the transmitter to transmit, to the first and the second UEs, downlink data based on reception of cashed information for the multicast group,
    wherein one transmission packet generated based on an exclusive OR (XOR) operation for the first and the second data, is transmitted to the first and second UEs based on a first transmission time, when the cashed information is received,
    wherein the first and the second data are transmitted respectively to the first and the second UEs based on a same second transmission time, when the cashed information is not received, and
    wherein the first transmission time is a transmission time obtained for the one transmission packet, based on consideration of all channel environments between UEs in the multicast group and the BS.

6. The BS according to claim 5, wherein the first request signal includes information on whether the second data exists in a cache of the first UE, and the second request signal includes information on whether the first data exists in a cache of the second UE.

7. The BS according to claim 5, wherein the one transmission packet includes information on whether the XOR operation is used for the first and the second data.

8. The BS according to claim 5, wherein the processor is further configured to:
    control the transmitter to transmit scheduling information required for the first and the second UEs to receive the one transmission packet, and
    wherein the scheduling information includes information on whether the XOR operation is used for the first and the second data.

* * * * *